United States Patent [19]
Malott et al.

[11] Patent Number: 5,716,171
[45] Date of Patent: Feb. 10, 1998

[54] DEBURRING TOOL

[75] Inventors: Garry R. Malott, New Haven; Donald E. Stearns, Jr., Ft. Wayne; Timothy D. Sordelet, Churubusco, all of Ind.

[73] Assignee: Dana Corporation, Toledo, Ohio

[21] Appl. No.: 614,280

[22] Filed: Mar. 12, 1996

[51] Int. Cl.$^6$ .............................. B23B 29/14; B23B 51/10
[52] U.S. Cl. ............................... 408/187; 407/9; 408/713
[58] Field of Search .............................. 407/7–9; 408/79, 408/80, 154, 155, 161–163, 187–191, 194, 199, 224, 227, 713

[56] References Cited

U.S. PATENT DOCUMENTS

| | | | |
|---|---|---|---|
| 2,620,689 | 12/1952 | Cogsdill | 408/187 |
| 2,748,631 | 6/1956 | Neale | 77/73 |
| 3,289,274 | 12/1966 | Brucato | 407/9 |
| 4,343,577 | 8/1982 | Purdon | 408/226 |
| 4,505,626 | 3/1985 | Benhase | 408/224 |
| 5,054,201 | 10/1991 | Andrews | 30/172 |
| 5,288,184 | 2/1994 | Heule | 408/224 |

*Primary Examiner*—Steven C. Bishop
*Assistant Examiner*—Mark Williams
*Attorney, Agent, or Firm*—Oldham & Oldham Co., LPA

[57] ABSTRACT

A deburring tool comprising a barrel having a blade slot integrally formed in its top end and a blade having an aperture disposed therethrough freely positioned within the blade slot. A blade axle aperture is disposed through the barrel and the blade slot. The blade axle is positioned within the blade axle aperture and through the blade aperture in order to secure the blade within the blade slot. A resilient positioning member aperture is integrally formed in the bottom end of the barrel for receiving the resilient positioning member. The resilient positioning member maintains contact with the blade and exerts an outward force against it. The blade is able to retract if forced but will immediately extend outward due to the resilient positioning member as soon as any opposing forces dissipate.

17 Claims, 2 Drawing Sheets

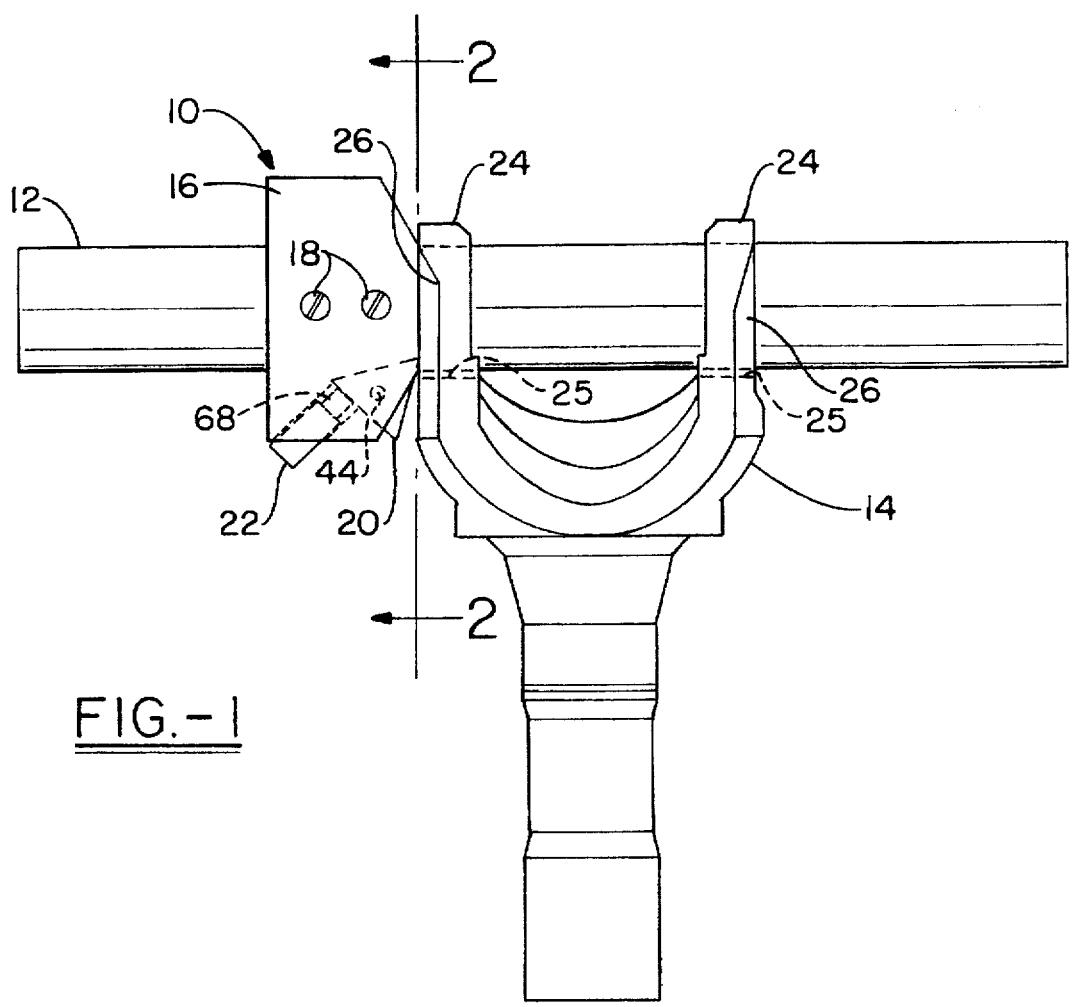
FIG.-1
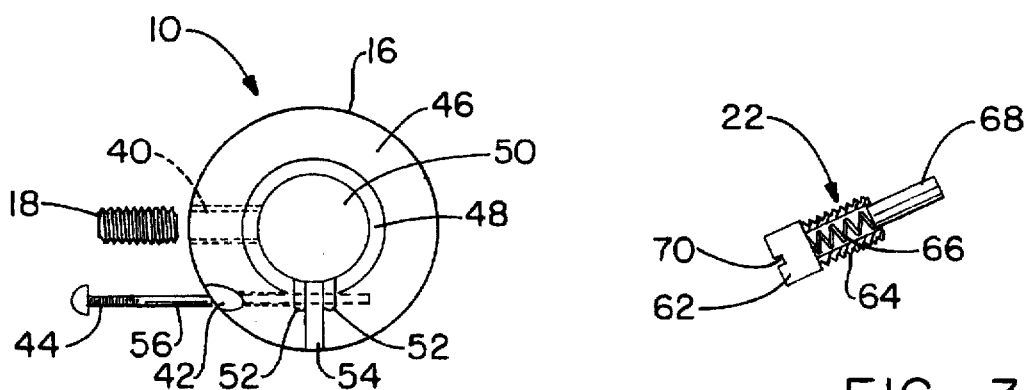
FIG.-2
FIG.-3

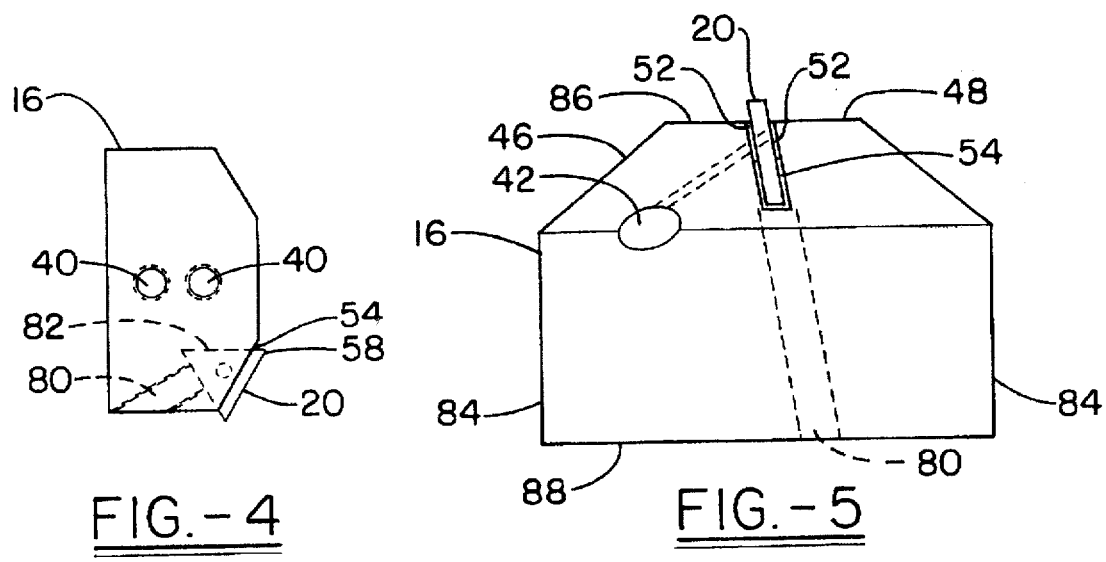
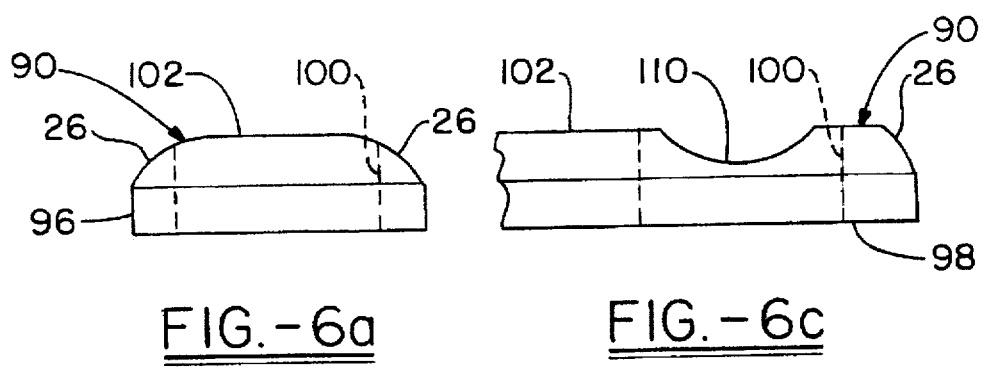
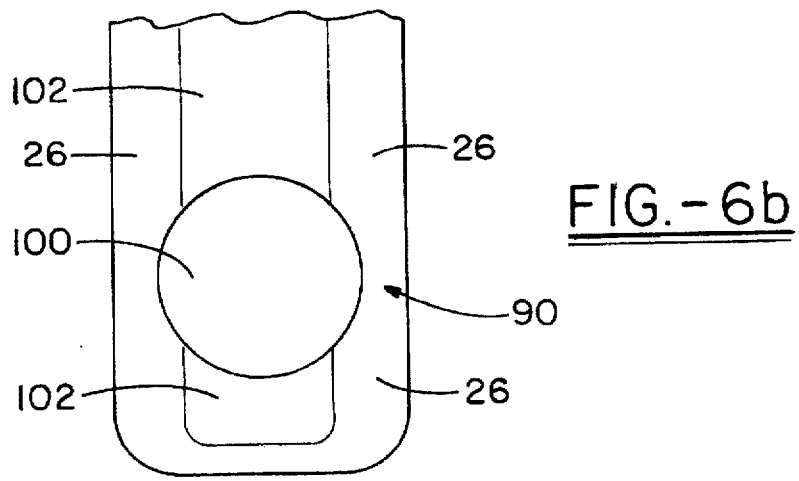

DEBURRING TOOL

FIELD OF INVENTION

This invention relates generally to a deburring tool, and more particularly to a triangular blade mounted to pivot freely about a center axis on a rotatable tool for deburring an uneven surface.

BACKGROUND OF THE INVENTION

A variety of known deburring tools for use on even surfaces have been developed which include blades mounted in various fixed positions on the tool. One type of deburring tool includes a blade rigidly secured to a rotatable tool. The blade is used for deburring a work piece and is designed as a chamfer knife to provide the outer edge of a bore with a slanted chamfer or beveled edge. Another type of known deburring tool utilizes several fixed, indexable blades or cutting elements. There are also known manual deburring tools which use the cutting elements which are fixedly attached. Although known deburring tools work fairly effectively on even surfaces, the fixed blades used on such tools do not accommodate uneven surfaces, and are thus useful to a limited extent.

SUMMARY OF THE INVENTION

The preferred embodiment of the deburring tool in the present invention comprises a barrel having a blade slot integrally formed in its top end. A blade having an aperture disposed therethrough is freely positioned within the blade slot. A blade axle aperture is disposed through the barrel and the blade slot. The blade axle is positioned within the blade axle aperture and through the blade aperture in order to secure the blade within the blade slot. A resilient positioning member aperture also is integrally formed in the bottom end of the barrel for receiving the resilient positioning member which maintains contact with and exerts force against the blade. The blade is able to retract if forced but will immediately extend outward due to the resilient positioning member as soon as any opposing forces dissipate.

The deburring tool of the preferred embodiment is advantageous over the prior art because it is capable of deburring holes or bores in uneven surfaces. While the blade is moving across an uneven surface with a bore through it, the resilient positioning member forces the blade to extend outward thereby reaching material burrs on the lower edges of the bore. When the blade moves across even higher surfaces, it retracts preventing damage or beveling from occurring. The deburring tool can also be effectively used on entirely even surfaces, eliminating the need for several different tools depending on the work piece surface.

BRIEF DESCRIPTION OF THE DRAWINGS

FIG. 1 is a side elevational view of the preferred embodiment of the deburring tool in relation to a work piece.

FIG. 2 is a partial top end plan view of the deburring tool alone taken along line 2—2 of FIG. 1.

FIG. 3 is a side elevational view partly in section of the resilient positioning member.

FIG. 4 is a partially assembled side elevational view of the deburring tool as shown in FIG. 1.

FIG. 5 is a partially assembled and ghosted side elevational view of the deburring tool as shown in FIG. 1.

FIGS. 6a–6c show respectively show front, top and side views of a sample work piece with a bore disposed through an uneven surface.

All drawings use consistent reference numerals when identifying identical or similar elements and other characteristics.

DETAILED DESCRIPTION OF THE PREFERRED EMBODIMENT

In accordance with FIG. 1, the preferred embodiment of deburring tool 10 is shown in relation to work piece 14. Deburring tool 10 is fixedly mounted to drive shaft 12 by a plurality of set screws 18. Drive shaft 12 is then inserted through bores in work piece 14, which for purposes of example is a yoke 14. Drive shaft 12 passes through bores 25 in the ears 24 of yoke 14 with deburring tool 10 coming in contact with uneven surface 26. Rotation of drive shaft 12 causes deburring tool 10 to rotate allowing blade 20 to cut or deburr any undesired chips or flakes of material left behind about the periphery of bores 25 when ears 24 of yoke 14 were bored. Blade 20 compensates for variances caused by bores in uneven surfaces 26 by varying its position in relation to the uneven surface 26. Resilient positioning member 22 provides blade 20 with a spring biased outward default position but allows blade 20 to retract into barrel 16 of deburring tool 10 when the position of uneven surface 26 applies enough force against blade 20.

The significant improvement provided by the present invention is that deburring tool 10 compensates for differences in a bores circumference when the surface of the work piece is uneven. FIG. 6 shows a work piece having such an uneven surface, such as the outer surface 90 of ear 24 shown in FIG. 1. FIG. 6b shows bore 100 disposed in the work piece. Even surface 102 is the result of the work piece being broached but portions of bore 100 are through uneven surfaces 26. As can be seen from FIG. 6c, portions of bore 100's circumference are at a lower position 110 with respect to even surface 102. Known deburring tools must be forced within bore 100 in order to reach burrs associated with the lower portions 110 of bore 100 located on uneven surface 26. The result of forcing the deburring tool deeper into bore 100 is even surface 102 becomes beveled, not just deburred. While the work piece, such as ear 24 of yoke 14, has a partially even surface 102 due to being broached, the effects of an uneven surface become more pronounced if the bore is through a fully circular work piece, such as a pipe or tube. The prior art becomes even less effective and can damage and warp the shape of a bore when used to deburr the uneven surfaces.

Referring to FIG. 2, deburring tool 10 comprises barrel 16 with drive shaft aperture 50 disposed through the center of barrel 16. Aperture 50 has a predetermined diameter which is only slightly larger than the diameter of drive shaft 12. This arrangement prevents barrel 16 from being skewed off center of drive shaft 12 when mounting set screws 18 are tightened against drive shaft 12. Set screws 18 are threaded into set screw apertures 40 which are drilled and tapped to cooperate with the predetermined type of set screw 18 used. FIG. 4 shows that the preferred embodiment employs two set screw apertures 40 bored through one side of barrel 16 and into drive shaft aperture 50. For simplicity, the two set screw apertures 40 have been positioned next to each other in a linear fashion but other arrangements are contemplated such as having three set screws 18 spaced 120 degrees apart along the outer circumference of barrel 16. The positioning of set screw apertures 40 and set screws 18 in the preferred embodiment does not limit the mounting means that may be employed in connecting barrel 16 to drive shaft 12. In an alternate embodiment of deburring tool 10, drive shaft 12 is fixedly attached through methods known in the art, such as welding, to barrel 16 eliminating the need for set screws 18 and their associated apertures 40 in barrel 16.

Again, referring to FIG. 2, barrel 16 has a conical upper portion 46 which decreases in diameter as it approaches planar ridge 48 located at the top end 86 of barrel 16 (see FIG. 5) which will come into contact with work piece 14. To one side of barrel 16 beginning at planar ridge 48, a blade slot 54 is formed for receiving triangular blade 20. As will be described later, blade slot 54 is formed from planar ridge 48 of barrel 16 and descends diagonally into barrel 16. Also formed in barrel 16 is a blade axle aperture 42 for receiving blade axle 44. Once blade 20 is positioned in blade slot 54, blade axle 44 is inserted into blade axle aperture 42 and through blade aperture 82, as shown in FIG. 4, thereby securing blade 20 in place and providing a center axis for which blade 20 can freely rotate about. Blade axle 44 in the preferred embodiment is a screw that mates with blade axle aperture 42 which is tapped for the appropriate screw thread size. Only a portion of blade axle 44 is threaded with the threadless portion 56 being the portion which blade 20 will rotate about. By not including threads on the portion blade 20 utilizes as its center axis, resistance and friction are reduced providing better rotation characteristics. Although not shown, even a fully threaded screw would work and the applicant contemplates the use of a regular screw, different types of insertable pins, and any other means for providing a center axis for blade 20. Blade reinforcement guides 52 are located on either side of and adjacent blade slot 54 to provide further support and guidance for blade 20. Both blade reinforcement guides 52 have apertures therethrough which are aligned with blade axle aperture 42 allowing blade axle 44 to pass through each aperture and blade 20.

Referring now to FIG. 4, barrel 16 of deburring tool 10 is shown with blade 20, represented partially by ghosted lines, positioned in blade slot 54. Also shown in ghosted lines is resilient positioning member aperture 80 which is tapped to allow resilient positioning member 22 to be fixedly inserted into aperture 80. FIG. 3 shows one embodiment of resilient positioning member 22 which comprises slotted head 62, threaded sleeve 64, spring 66, and tappet 68. Tappet 68 is defined as a projection moved by another object which is intended to tap or touch something else to cause a particular motion. As will be explained, tappet 68 ultimately is used to apply a constant outward force against blade 20.

Slotted head 62 provides a slot 70 for receiving a screw driver or other tool in order to fixedly attach resilient positioning member 22 within aperture 80. Slot 70 could be any shape typically used for screw heads such as flat head, Phillips head or others known in the art, or head 62 could be of a particular shape to allow rotation by a suitable tool. Threaded sleeve 64 extends from the side of head 62 opposite slot 70 and is hollow with threads appropriately sized to communicate with the threads of aperture 80. Disposed within threaded sleeve 64 is spring 66 and tappet 68. Spring 66 is positioned between slotted head 62 and tappet 68 and provides a positive, yet resilient force which pushes tappet 68 in the direction away from slotted head 62 or outward toward blade 20. FIG. 1 shows tappet 68 in ghosted lines asserting force against one side of blade 20. Force is applied by tappet 68 off center to triangular blade aperture 82 and blade axle 44, thereby forcing blade tip 58 (best shown in FIG. 4) out of blade slot 54 to its fullest extension. While other shapes could be used for blade 20, the triangular shape allows blade 20 to be rotated three times before it needs to be replaced due to normal wear. The triangular shape also provides a convenient flat surface for resilient positioning member 22 to make contact with and exert outward force upon. In addition, other embodiments of resilient positioning member 22 are contemplated including simply using a screw to compress spring 66 or other suitable resilient member against blade 20.

FIG. 5 shows the diagonal positioning of resilient positioning member aperture 80, blade 20, blade slot 54, and blade axle aperture 42. To improve the cutting characteristics of deburring tool 10, blade 20 is positioned at an angle, otherwise known as a rake angle. While this configuration provides the contemplated cutting characteristics of deburring tool 10, other rake angles would work equally well including having blade 20 mounted in parallel with the sides 84 of barrel 16. To accommodate the rake angle blade 20 is positioned in, resilient positioning member aperture 80 is also formed diagonally in line with blade slot 54. Also due to blade 20 being mounted at an angle, blade axle aperture 42 is formed at an appropriate perpendicular angle to allow proper positioning and insertion of blade axle 44. As briefly discussed earlier, FIG. 5 clearly shows planar ridge 48, upper conical portion 46 of barrel 16, and the top end 86 and bottom end 88 of barrel 16.

The freely pivoting movement of blade 20 about a center axis will now be discussed in more detail with reference to FIGS. 1 and 6. As deburring tool 10 is rotating in conjunction with drive shaft 12 and comes in contact with work piece 14, such as ear 24 of a yoke 14, blade 20 cuts material burrs from the outer edge of bore 100. While blade 20 is moving across uneven surfaces 26 of bore 100, which are lower and farther away from deburring tool 10 than even surface 102, resilient positioning member 22 forces blade 20 to extend outward thereby reaching material burrs on the lower edges of bore 100. When blade 20 moves across uneven surfaces 26 and onto even surface 102, the edge of bore 100 becomes higher and therefore closer to deburring tool 10. Because positioning member 22 is resilient, blade 20 retracts into blade slot 54 due to the force exerted upon blade 20 by the higher edges of bore 100. As deburring tool 10 continues to rotate about bore 100, the cycle of blade 20 extending and retracting repeats as blade 20 passes over the lower uneven surface 26 and the higher even surface 102. Blade 20 extends and retracts freely due to its low friction center axis about which it rotates. If blade 20 could not pivot freely about a center axis and did not have a resilient positioning member 22, either the lower edges of bore 100's uneven surface 26 would not be deburred or the higher edges of bore 100's even surface 102 would be beveled rather than deburred. Such beveling would cause damage to work piece 14 and extensive wear and damage to blade 20.

An added advantage of deburring tool 10 is that it can also be used to deburr bores in entirely even surfaces based on the same principles discussed earlier for when blade 20 is moved across the even portions of work piece 14. This eliminates the need for several different deburring tools which saves time and money, with both the initial purchasing and maintenance of the tool. Other known applications for deburring tool 10 are its use on axle tubes, carrier trunnions, spreader holes, and virtually any other hole within an uneven surface. Deburring tool 10 could be used on any size hole by simply being built to the appropriate scale.

Types of material used to construct the preferred embodiment of deburring tool 10 will now be described. It is to be understood that other materials not mentioned may also be suitable depending upon the application for deburring tool 10. For example, if used to deburr bores in plastic, wood, or aluminum uneven surfaces, deburring tool 10 could be completely fabricated from hardened plastic as is known in the art. The fabrication of and uses for deburring tool 10 are virtually unlimited and discussion of the preferred embodiment and contemplated applications are not meant to limit the scope of the invention as disclosed and claimed.

Because deburring is very common when bores are made in metal products, the associated deburring tool 10 is usually be fabricated from highly durable metals and alloys. The components of deburring tool 10 that will be subjected to substantial wear and tear are blade 20, barrel 16, blade reinforcement guides 52, and blade axle 44. While using the most durable material for all components will result in a better deburring tool, other components not subjected to extreme forces can be fabricated from less expensive materials. The preferred material for the above mentioned components is hardened carbon tool steel. Hardened carbon steel has shock resistance, can be heat-treated which can alter its hardness, and holds a cutting edge well. Other materials that may be used include, but are not limited to, high speed steels, cast alloys, cemented carbides, coated carbides, or cubic boron nitride.

As stated, a variety of materials, configurations, and applications can be employed in the practice of this invention. It is to be understood that such variations are intended to fall within the scope of the claimed invention and that the subject invention is not to be limited by the specific apparatus or method of operation described and/or depicted by the drawings nor is the invention to be limited by the specific materials and mechanical components identified and described herein. These have been designated merely to provide a demonstration of operability and the selection of mechanically equivalent arrangements is not deemed a departure from the spirit of the invention being limited solely by the scope of the attached claims.

What is claimed is:

1. A deburring tool for removing materials around the periphery of a bore comprising:

a barrel having a diameter which is greater than the diameter of said bore;

at least one blade slot integrally formed in a first end of said barrel;

at least one blade movably positioned within said at least one blade slot;

at least one blade axle aperture disposed through both said barrel and said at least one blade slot for receiving at least one blade axle associated with said at least one blade;

at least one resilient positioning member aperture integrally formed in said barrel for receiving at least one resilient positioning member, said at least one resilient positioning member aperture communicating with said at least one blade slot;

said at least one blade axle coupled within said at least one blade axle aperture, said at least one blade axle securing said blade within said at least one blade slot; and said at least one resilient positioning member provided within said at least one resilient positioning member aperture, wherein said at least one resilient positioning member applies force on said at least one blade within said at least one blade slot.

2. A deburring tool as recited in claim 1, further comprising a shaft integrally coupled to said barrel.

3. A deburring tool as recited in claim 1, wherein said barrel further comprises a securing mechanism to secure said tool on a drive shaft for rotation therewith.

4. A deburring tool as recited in claim 3, wherein said barrel has an aperture formed along a longitudinal axis thereof said securing mechanism comprises at least one set screw aperture disposed through said barrel and extends into said aperture for receiving at least one set screw.

5. A deburring tool as recited in claim 1, wherein said first end of said barrel comprises a conical portion which gradually decreases in diameter approaching said first end of said barrel.

6. A deburring tool as recited in claim 1, wherein said at least one blade slot for receiving said at least one blade is formed in said barrel, said at least one blade slot beginning at said first end of said barrel and extending at an angle to the longitudinal axis of said barrel.

7. A deburring tool as recited in claim 1, wherein said at least one blade is triangular in shape with an aperture disposed therethrough for receiving said blade axle for said at least one blade to pivot freely about.

8. A deburring tool as recited in claim 1, wherein said at least one blade is fabricated from a material selected from the group consisting of hardened carbon steel, high speed steel, cast alloys, cemented carbides, coated carbides, cubic boron nitride, wood, or plastic.

9. A deburring tool as recited in claim 1, wherein said at least one blade axle aperture for receiving said at least one blade axle is formed diagonally in said barrel and aligned in substantially the same orientation of said at least one edge of said at least one blade slot.

10. A deburring tool as recited in claim 1, wherein said at least one resilient positioning member comprises:

a head secured within said positioning member aperture;

a sleeve extending from said head;

a spring member disposed within said sleeve;

a tappet disposed within said head; wherein said spring is positioned between said head and said tappet to force said tappet away from said head.

11. A deburring tool as recited in claim 1, wherein said at least one resilient positioning member comprises:

a spring member, positioned within said at least one resilient positioning member aperture which applies force on said at least one blade such that said blade is biased to a first position, wherein said blade is movable within said blade slot against said force applied by said spring member.

12. A deburring tool as recited in claim 1, further comprising:

a pair of blade reinforcement guides each having an aperture therethrough, each of said blade reinforcement guides being positioned on either side of said blade; wherein said blade axle in cooperation with said blade reinforcement guides maintains the position of said blade.

13. A deburring tool as recited in claim 1, wherein:

said blade axle is partially threaded and cooperates with threads in said blade axle aperture to secure said blade axle therein, and wherein unthreaded portion of said blade axle pivotably supports said at least one blade.

14. A deburring tool as recited in claim 1, wherein said deburring tool compensates for variances in said bore due to an uneven surface by varying the position of said blade in relation to said uneven surface.

15. A deburring tool for removing material adjacent the peripheral edges of a bore comprising a tool holder having a diameter which is greater than the diameter of said bore and at least one cutting blade coupled therewith adjacent a first end of said holder, said cutting blade being movably secured within at least one slot formed in said holder, said tool holder further having a positioning member which positions said cutting blade adjacent said peripheral edges of said bore and applies a biasing force on said at least one cutting blade such that said cutting blade is biased to a first position and is movable within said slot upon application of an external force on said at least on cutting blade.

16. A deburring tool as recited in claim 15, wherein, said at least one cutting blade is secured to said tool holder by means of an axle member and is pivotable about said axle member within said at least one slot.

17. A deburring tool as recited in claim 15, wherein, said positioning member is spring mounted with said tool holder and cooperates with said slot so as to apply said biasing force on an edge of said cutting tool.

* * * * *